(12) United States Patent
Zhou et al.

(10) Patent No.: US 12,619,523 B2
(45) Date of Patent: May 5, 2026

(54) IDENTIFICATION OF EMBEDDED BROWSERS IN APPLICATION FOR AUTOMATED SOFTWARE TESTING

(71) Applicant: MICRO FOCUS LLC, Santa Clara, CA (US)

(72) Inventors: Gaoyang Zhou, Shanghai (CN); Kai Zhou, Shanghai (CN); Sagi Zhang, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 394 days.

(21) Appl. No.: 18/118,635

(22) Filed: Mar. 7, 2023

(65) Prior Publication Data

US 2024/0303183 A1    Sep. 12, 2024

(51) Int. Cl.
*G06F 11/3698*          (2025.01)
*G06F 11/3668*          (2025.01)

(52) U.S. Cl.
CPC ...... *G06F 11/3698* (2025.01); *G06F 11/3684* (2013.01); *G06F 11/3688* (2013.01)

(58) Field of Classification Search
CPC ............. G06F 11/3698; G06F 11/3684; G06F 11/3688
USPC ........................................................ 717/125
See application file for complete search history.

(56) References Cited

U.S. PATENT DOCUMENTS

| | | | | |
|---|---|---|---|---|
| 10,169,030 B1 * | 1/2019 | Claessens | ............. | G06F 9/4843 |
| 10,210,074 B1 * | 2/2019 | Szerenyi | ............. | G06F 11/3688 |
| 10,715,542 B1 * | 7/2020 | Wei | ........................ | G06F 16/958 |
| 2002/0026505 A1 * | 2/2002 | Terry | ...................... | G06F 21/57 |
| | | | | 709/224 |
| 2011/0214107 A1 * | 9/2011 | Barmeir | ............. | G06F 11/3684 |
| | | | | 717/125 |
| 2020/0036770 A1 * | 1/2020 | Hu | ........................... | H04L 67/08 |
| 2024/0181876 A1 * | 6/2024 | Larsson | ................ | B60W 40/08 |

\* cited by examiner

*Primary Examiner* — Bradford F Wheaton
(74) *Attorney, Agent, or Firm* — Sheridan Ross P.C.

(57)                ABSTRACT

Software applications often incorporate an embedded browser to perform web-based operations. Not all browsers operate the same way, for example, elements within tabs in Microsoft Edge browsers use messages to communicate through web extensions, while Microsoft Internet Explorer (IE) browsers use the original browsers helper object (BHO). A consequence of the different paradigms is that certain graphical elements may be duplicated in a resource table. A test development may fail to identify the duplication and may produce extraneous or erroneous tests. By launching on a system and monitoring the system's executing processes, a browser application may be determined to be running and, if so, a refresh operation is performed on an application under test (AUT). If the AUT refresh operation results in a browser also performing a refresh, the type of embedded browser may be identified and any duplicates of the same graphical elements identified and merged for subsequent testing.

19 Claims, 5 Drawing Sheets

IDENTIFICATION OF EMBEDDED BROWSERS IN APPLICATION FOR AUTOMATED SOFTWARE TESTING

FIELD OF THE DISCLOSURE

The invention relates generally to systems and methods for identifying embedded browser applications and particularly to accurately identifying software elements for automated testing.

BACKGROUND

Codeless testing platforms, such as those utilizing artificial intelligence (AI), discover features of an application under test (AUT) and then select or generate tests to be performed on the AUT. An AUT may include other applications, such as web browsers, that are executed by extensions to the AUT for that application. For example, a user of the AUT, or the AUT itself, may utilize an embedded web browser as a means to interact with a web server, such as to obtain information, or perform an operation comprising the web server, or for other purposes.

For example, the Microsoft Edge browser in Internet Explorer (IE) mode presents an IE browser inside an Edge tab. A client application provides a Chromium Embedded Framework (CEF). As a result, an automated testing application, such as a unified functional testing (UFT), needs to be able to correctly identify an embedded browser to access the graphical elements therein.

When the UFT incorrectly identifies an embedded browser, and the graphical elements of the embedded browser, the UFT may unnecessarily generate tests directed to the AUT, which must be updated even if only the embedded browser is changed. For example, if a different (or additional) embedded browser is added or an embedded browser is removed or a relied upon feature of the embedded browser is altered, the test scripts for the AUT must be maintained accordingly. As a result, reprocessing the test scripts of the AUT is required even though the AUT itself is unchanged.

Prior art solutions may add code to the source code of the AUT to make identification of an embedded browser apparent to the automated systems, such as by using a particular extension that declares a browser. However, this requires access to the source code, which may not be possible, as well as adding code that may not be included in released versions of the AUT. As a result, what is tested differs from the product as released to end users. Similarly, not detecting an embedded web browser may omit necessary tests, such as determining if the web browser will access a site known to contain malware, launch another application, or other action that is expected to be prohibited. Additionally, the AUT must properly implement the in-app browser, such as to ensure only the expected number of browser tabs or windows are correctly launched, resources are released upon closure, and the operations performed with a server, via the browser, operate as expected. For example, a user may open an application (stand-alone or itself a browser) and want to change their password, which is performed via a browser interfacing with a server).

SUMMARY

How an embedded browser works depends on the architecture selected by the developer. For Microsoft Edge, and any other browsers utilizing a similar architecture, tabs in the Edge browser operate differently from IE mode tabs and similar browsers. For example, IE mode tabs use the original browser helper object (BHO), which is implemented by injecting a dynamic link library (DLL) through the BHO. In contrast, Edge mode tabs use messages to communicate through extensions. In the Edge browser, an IE mode tab is contained under another Edge mode tab which means that if an IE mode tab is created in Edge browser, two tabs result, specifically, one Edge mode tab that contains an IE mode tab.

When a UFT is operating on a graphical user interface (GUI) having a page utilizing IE mode, for operations such as reload or URL navigate, the UFT needs to send commands to the Edge tab containing the IE mode tab. For button click or edit box input in the page, the command is sent directly to the IE mode tab itself.

A UFT that generates tests (e.g., test scripts) to test graphical elements of an embedded browser, as a test of the UFT, is unnecessarily burdened by the specifics of the embedded browser. A change to the embedded browsers, or the functionality thereof, requires tests of the UFT to be updated.

An AUT with an embedded browser may appear to a user as being the same tab as that of the AUT. Additionally, a list of graphical elements to be tested may identify two different graphical elements as test object, each having a distinct runtime identifier. One is the graphical element as identified as a test object of the AUT and another is the graphical element as identified as a test object of the embedded browser, even though they are both the same graphical element. The different tabs being controlled by different extensions (e.g., an application extension of the UFT to run the AUT and a web extension to run the embedded browser). As a result, two distinct hierarchies of objects are identified in an object hierarchy. As a result, the embedded browser may be determined by the UFT as being a standalone application.

These and other needs are addressed by the various embodiments and configurations of the present invention. The present invention can provide a number of advantages depending on the particular configuration. These and other advantages will be apparent from the disclosure of the invention(s) contained herein.

In one embodiment, a list of potential embedded browsers is created or accessed that identifies a number of embedded browsers that may be encountered (e.g., Edge, SAP GUI, NWBC Desktop, etc.).

While some UFTs are programmed to perform a determined set of tests on an AUT, as contemplated herein, the UFTs, in whole or in part, self-program by discovering graphical elements of an AUT and generating and executing tests on those graphical elements. Before performing an examination of an AUT to determine the graphical elements therein, the UFT executes the AUT and examines a list of running browsers to determine if at least one known embedded browser is also executing. If an embedded browser is running, the UFT triggers a "refresh" on the AUT and monitors system activity (e.g., running processes, activity on the UFT's web extension, etc.). If the refresh event for the embedded browser is received, then the AUT is associated with the embedded browser and is under the control of the UFT web extension and, when recording a script to be used to generate a corresponding test, the AUT is included in the identifier for the graphical elements of the embedded browser.

In another embodiment, the UFT comprises a plurality of web extensions which may be refreshed one by one in order to observe the results of any of executing embedded browsers. If the AUT is refreshed and a refresh event is observed for browsers such as IE, Chromium, Edge, CEF, webview2, etc., then the UFT will bind the responding embedded browser to the application. The target embedded browser's hierarchy of graphical elements may be generated or rebuilt to merge the graphical elements with those of the AUT and thereby remove duplicates.

In another embodiment, if two tabs (e.g., one tab being controlled by an application extension for the AUT, the other tab being controlled by a web extension for the embedded browser) identified in an object list of AUT objects are associated as a single entity (i.e., the AUT only), then a test script generated by the UFT will have a single browser object and tests performed on the single browser object and the graphical elements therein.

Benefits of the embodiments disclosed include incorporating any change to the web extension without requiring any change to the AUT or AUT application extension; dependency on third-party interfaces (e.g., web driver) is reduced; solution is universal to an AUT regardless of the embedded browser; and the embodiments may be applied to different applications.

The embodiments enable accurate and efficient identification of the relationship between an AUT and embedded browser. The embedded browser feature can be implemented without adding web-related code to other window extension code to the UFT. When other browser modes, or mode types, are added to the AUT, updating is limited to UFT's web extension controlling the embedded browser(s).

In one embodiment, a system is disclosed, comprising:

A method for configuring a testing application, comprising: executing an application under test (AUT) on a system; and determining that the system is co-executing the embedded browser with the AUT and when true: performing a refresh operation on the AUT; monitoring executing processes of the system; and determining from the monitoring whether a refresh operation of the embedded browser has occurred concurrently with the refresh operation performed on the AUT and, when the refresh operation of the embedded browser has occurred concurrently with the refresh operation, configuring the testing application to generate a test script to test a graphical element of the embedded browser comprising generating a test script to test the embedded browser and without generating a test script of the AUT.

A system for configuring a testing application, comprising: at least one processor; a computer memory; wherein the at least one processor accesses a non-transitory portion of the computer memory and instructions therein to cause the at least one processor to perform: executing an application under test (AUT) on the system; and determining that the system is co-executing the embedded browser with the AUT and, in response: performing a refresh operation on the AUT; monitoring executing processes of the system; and determining from the monitoring whether a refresh operation of the embedded browser has occurred concurrently with the refresh operation performed on the AUT and, when the refresh operation of the embedded browser has occurred concurrently with the refresh operation, configuring the testing application to generate a test script to test a graphical element of the embedded browser comprising generating a test script to test the embedded browser and without generating a test script of the AUT; and executing the testing application comprising executing the test script and reporting a result therefrom.

A system for configuring a testing application, comprising: means to execute an application under test (AUT) on a system; and means to determine that the system is co-executing the embedded browser with the AUT and when true: means to perform a refresh operation on the AUT; means to monitor executing processes of the system; and means to determine from the monitoring whether a refresh operation of the embedded browser has occurred concurrently with the refresh operation performed on the AUT and, when the refresh operation of the embedded browser has occurred concurrently with the refresh operation, means to configuring the testing application to generate a test script to test a graphical element of the embedded browser comprising generating a test script to test the embedded browser and without generating a test script of the AUT; and means to executing the test script and reporting a result therefrom.

A system on a chip (SoC) including any one or more of the above aspects or aspects of the embodiments described herein.

One or more means for performing any one or more of the above aspects or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
FIG. 1 depicts a system in accordance with embodiments of the present disclosure.
Figure 1:
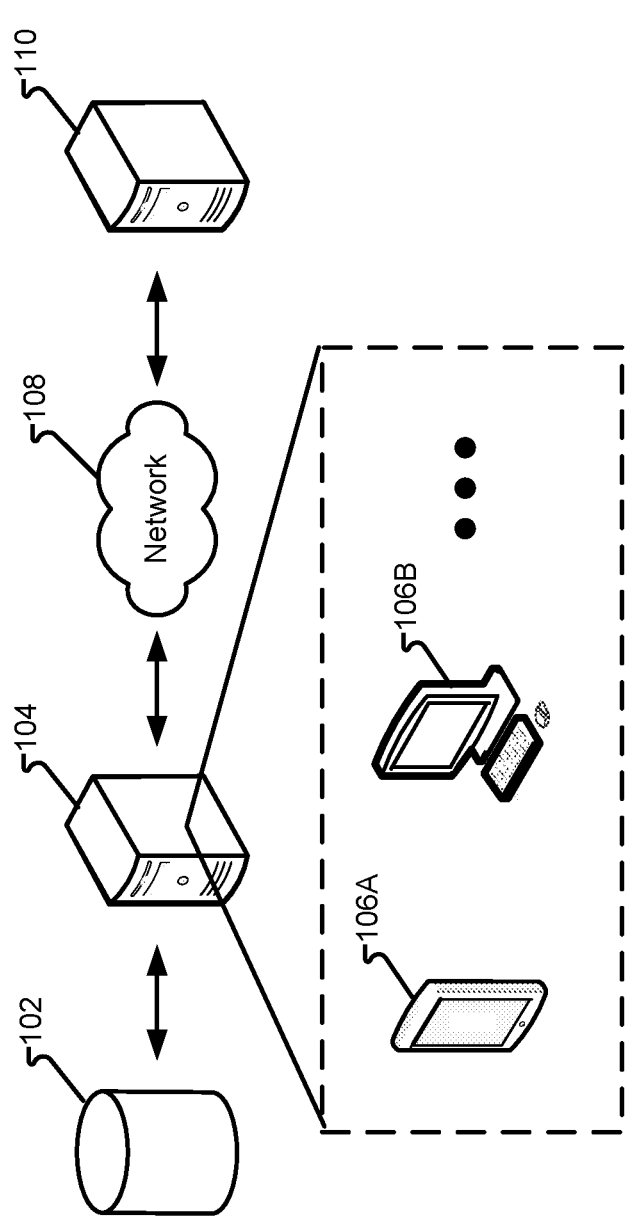

FIG. 1 depicts system 100 in accordance with embodiments of the present disclosure. Testing software applications may utilize a computer (or other electronic device) executing a software application or a first computer emulating a second computer's execution of the software application. The software application to be tested is one embodiment of an AUT. The AUT may comprise graphical elements used to present information to a user, such as via a display or other output component and receive inputs, such as via a mouse, keyboard, touchscreen, or other input component. For testing, the output of the software may be limited to values in a memory to simulate the output presented to the user when presented to a computer, such as server 104, executing a testing program (e.g., UFT). Similarly, server 104 executing the UFT may provide inputs in a manner that simulates a user's manipulation of an input device (e.g., mouse, keyboard, etc.).

In one embodiment, data storage 102 stores data which may include emulation configurations to cause server 104 to load the processor microcode or other attributes to configure server 104 to execute a simulation of emulated device 106, such as smart phone 106A, personal computer 106B, etc., applications to test (e.g., an AUT) and the execution of the AUT by emulated device 106. Testing of the AUT may comprise testing networked elements, such as a web browser of the AUT accessing web server 110 via network 108. It should be appreciated that other testing paradigms may be utilized without departing from the scope of the embodiments disclosed. For example, when physical computing devices, and the software executing thereon, are tested, the UFT may similarly execute on the same computing device and/or execute on a different device (e.g., server 104) that is placed into communication (wired or wireless connections) with the physical computing device to interact with the AUT for testing.

In another embodiment, server 104 (or other computing hardware) executes the UFT which may comprise instructions to "learn" how the AUT operates, but utilize, in whole or in part, an artificial intelligence, such as a trained neural network, to discover testable attributes of the AUT. For example, the AUT may require a sign-on (e.g., username and password) that may be provided to the UFT to have access to other functions of the AUT. However, the other functions may include graphical elements, such as selectable icons, informational icons, images, text, text input fields, etc. The UFT may be entirely self-directed and explore each option alone or in combination with other options or additionally or alternatively, monitor the progress of a user as they execute the AUT and reproduce and vary the observed interactions. It should be appreciated that the UFT's observations of a user's interaction with the AUT may be performed in real-time or captured and stored, such as in data storage 102, for subsequent retrieval by server 104 as a simulated observation of the user's interaction with the AUT.

Figure 2:
FIG. 2 depicts an architecture in accordance with embodiments of the present disclosure.
Figure 2:
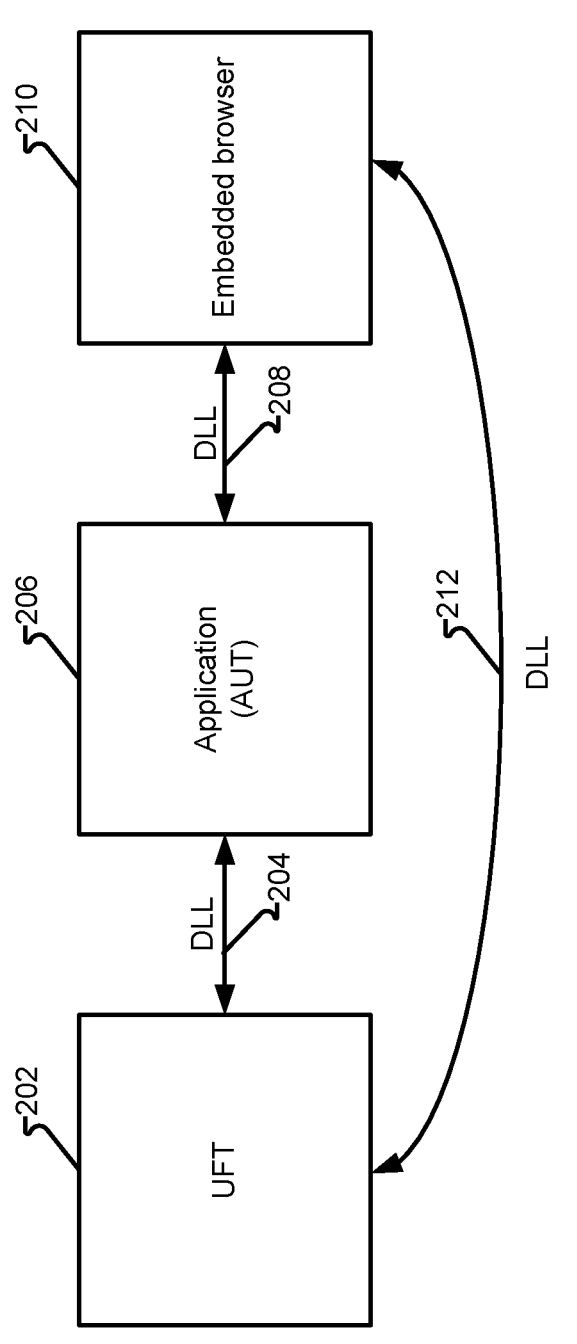

FIG. 2 depicts architecture 200 in accordance with embodiments of the present disclosure. In one embodiment, UFT 202 interacts (e.g., provides inputs and receives outputs) with AUT 206 via DLL 204, such as an application extension. AUT 206 interacts with embedded browser 210 via DLL 208, such as a browser extension. Additionally or alternatively, UFT 202 may interact with embedded browser 210 via DLL 212, such as a browser extension to communicate directly with embedded browser 210.

Figure 3:
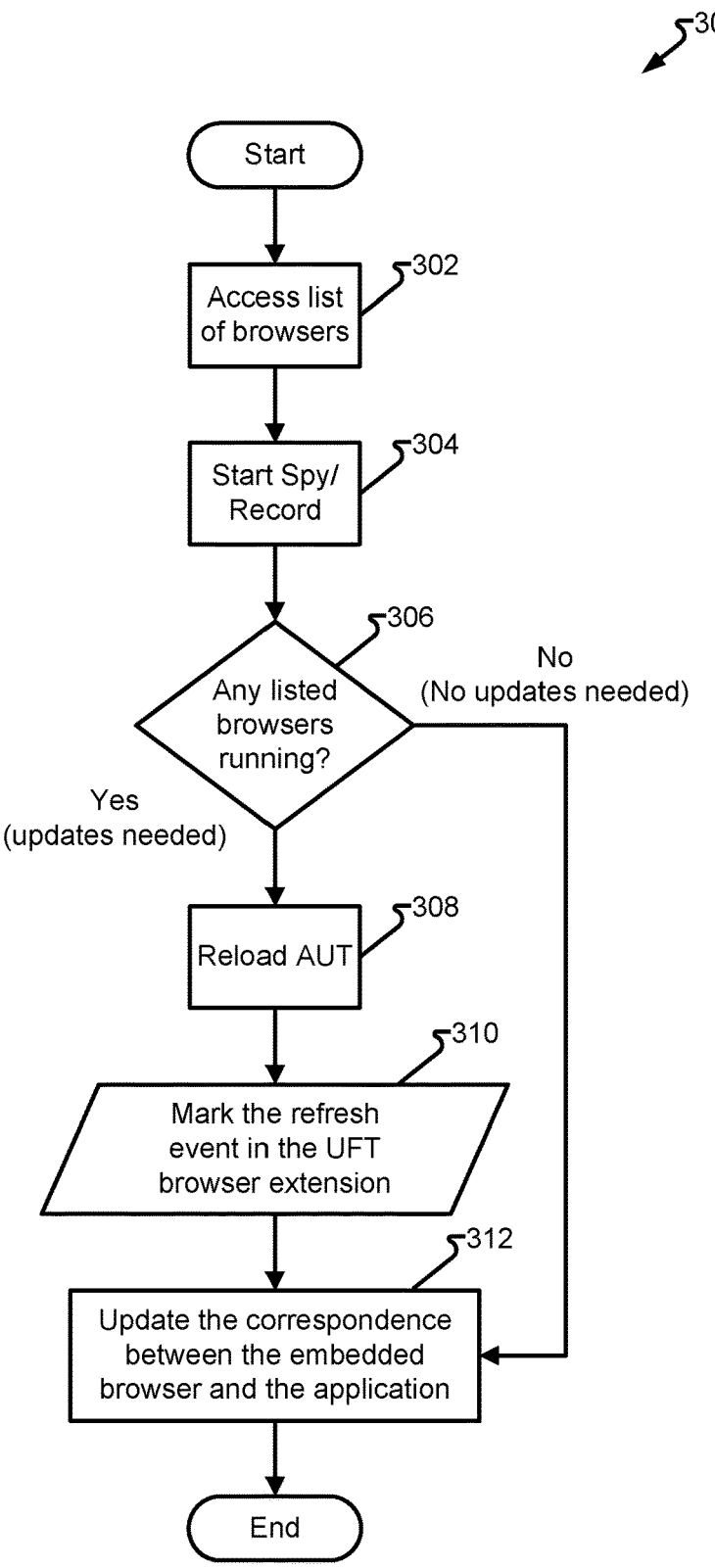
FIG. 3 depicts a process in accordance with embodiments of the present disclosure.

FIG. 3 depicts process 300 in accordance with embodiments of the present disclosure. Process 300 may be embodied as machine-readable instructions maintained in a non-transitory data storage that when read by a machine, such as a processor of server 104, cause the machine to perform the steps of process 300. It should also be appreciated that the steps of process 300 may be reordered, added to, split, combined, or otherwise restructured in other embodiments.

Process 300 begins and, in step 302, accesses a list of known browsers, such as may be maintained in data storage 102 and/or other data storage. Step 304 begins a "spy" and record of UFT 202 to observe interactions with AUT 206. Test 306 determines if any of the browsers are currently running, such as by examining a list of executing processes on a device (e.g., server 104) and/or observing interactions of a resource table for AUT 206.

If test 306 is determined in the negative, processing continues to step 312. If test 306 is determined in the affirmative, process 300 continues to step 308 wherein AUT 206 is reloaded. Operation 310 then marks the refresh event for any browser extensions that were observed to update in response to the update performed on AUT 206 in step 308. Step 312 then updates the corresponding relationship between embedded browser 210 and AUT 206, such as to identify embedded browser 210 as being controlled by AUT 206.

As a result, UFT 202 may be configured to perform testing on embedded browser 210 via commands addressed to graphical elements of embedded browser 210 that include server 104, when control is determined to exclude AUT 206 or when control is determined to be absent.

Figure 4:
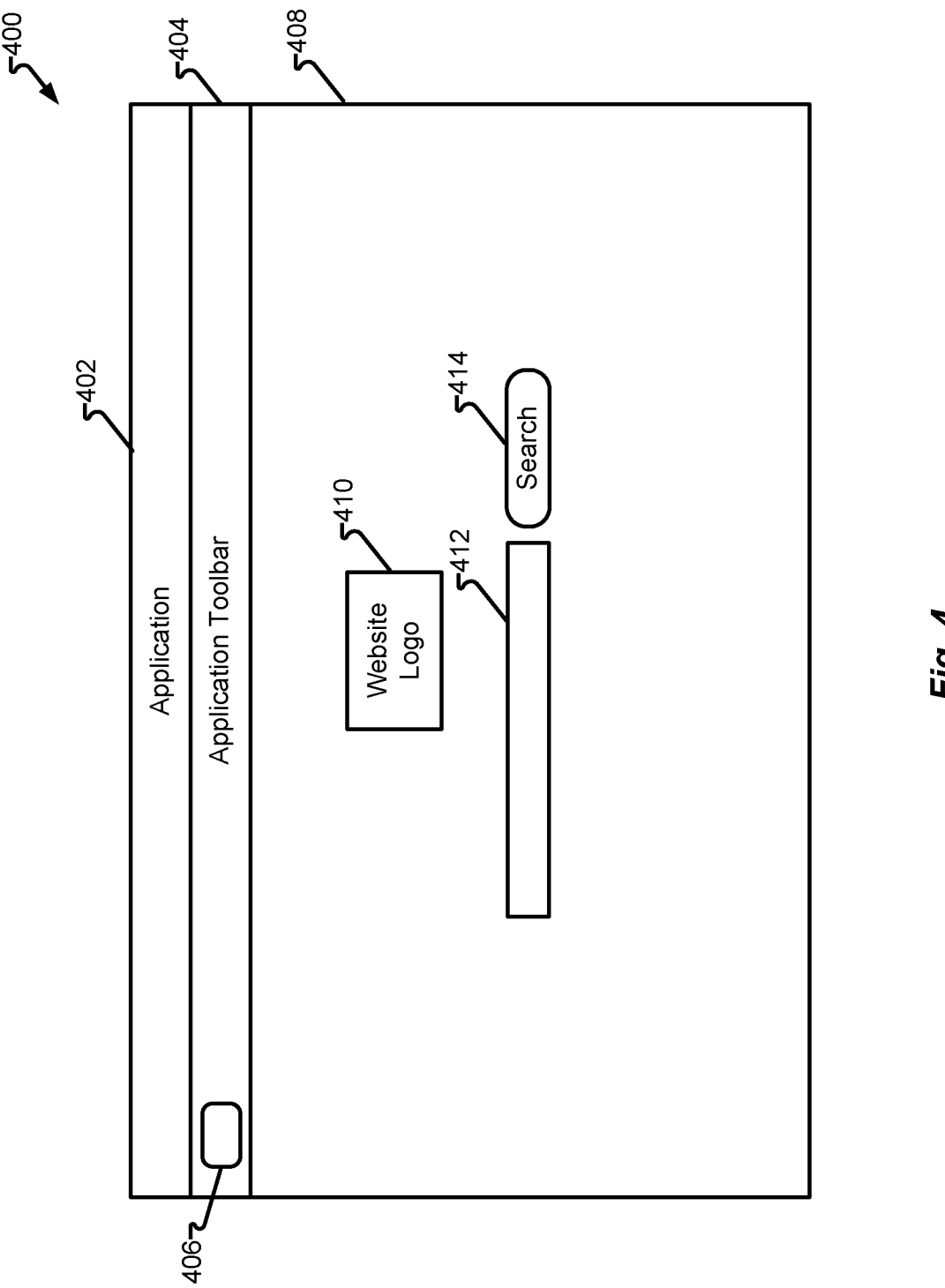
FIG. 4 depicts an application display presenting an output in accordance with embodiments of the present disclosure.

FIG. 4 depicts application display 400 presenting an output in accordance with embodiments of the present disclosure. Application display 400 may be presented on a display device, when presented to a human user, or as machine-readable data structures and/or data values in order to "display" application display 400 to UFT 202. It should be appreciated that the elements illustrated by application display 400 are one embodiment and that more, fewer, or different graphical elements (e.g., graphical element 406, graphical element 410, text input box 412, search button 414) may be utilized without departing from the scope of the embodiments.

Application display 400 comprises application window 402 which may comprise application toolbar 404 having graphical element 406. Graphical element 406 is a component of AUT 206 and is directly accessed by UFT 202, such as via DLL 204 (see FIG. 2). Application display 400 includes embedded browser window 408 which is controlled (e.g., executed, terminated, etc.) by AUT 206.

Embedded browser window 408 may appear to a human user as being a portion of a single application, namely AUT 206. However, UFT 202 identifies two different applications, AUT 206 and embedded browser 210. UFT 202 interacts with AUT 206 via DLL 204 (e.g., an application extension) and UFT 202 interacts with embedded browser 210 via embedded browser DLL 212 (e.g., a browser extension).

A user (human or automated) clicks on the search button 414, the action is reported by a browser extension (e.g., DLL 212), and UFT 202 records the event script, such as:

Browser("Website-Website Search").Page("website-Website Search").WebButton("Website Search").Click An action in application toolbar 404, such as to graphical element 406, is reported by a website extension (e.g., DLL 204), and UFT 202 records the event script, such as:

ApplicationGuiSession("Session").ApplicaitonGuiWindow("HTML Control as WWW browser").Select By enabling UFT 202 to identify that the browser is embedded into another window application, UFT 202 then generates scripts, such as:

ApplicationGuiSession("Session").ApplicationGuiWindow("HTML Control as WWW browser").Page("Website—Website Search").WebButton("Website Search").Click when we click the "Website Search" button.

UFT 202 may then be self-configured to perform tests on the graphical elements utilizing the generated scripts. For example, avoiding tests on one graphical element, when the one graphical element is identified as two graphical elements, one in the object hierarchy of the application (e.g., AUT 206) and other in the object hierarchy of the embedded browser (e.g., embedded browser 210), is avoided. Additionally or alternatively, testing of AUT 206 may include test scripts for the embedded browser (e.g., text input box 412, search button 414) via AUT 206 and, therefore, tested but without adding specific web-based tests to UFT 202. UFT 202 may then execute the tests on the identified graphical elements and report results therefrom.

Figure 5:
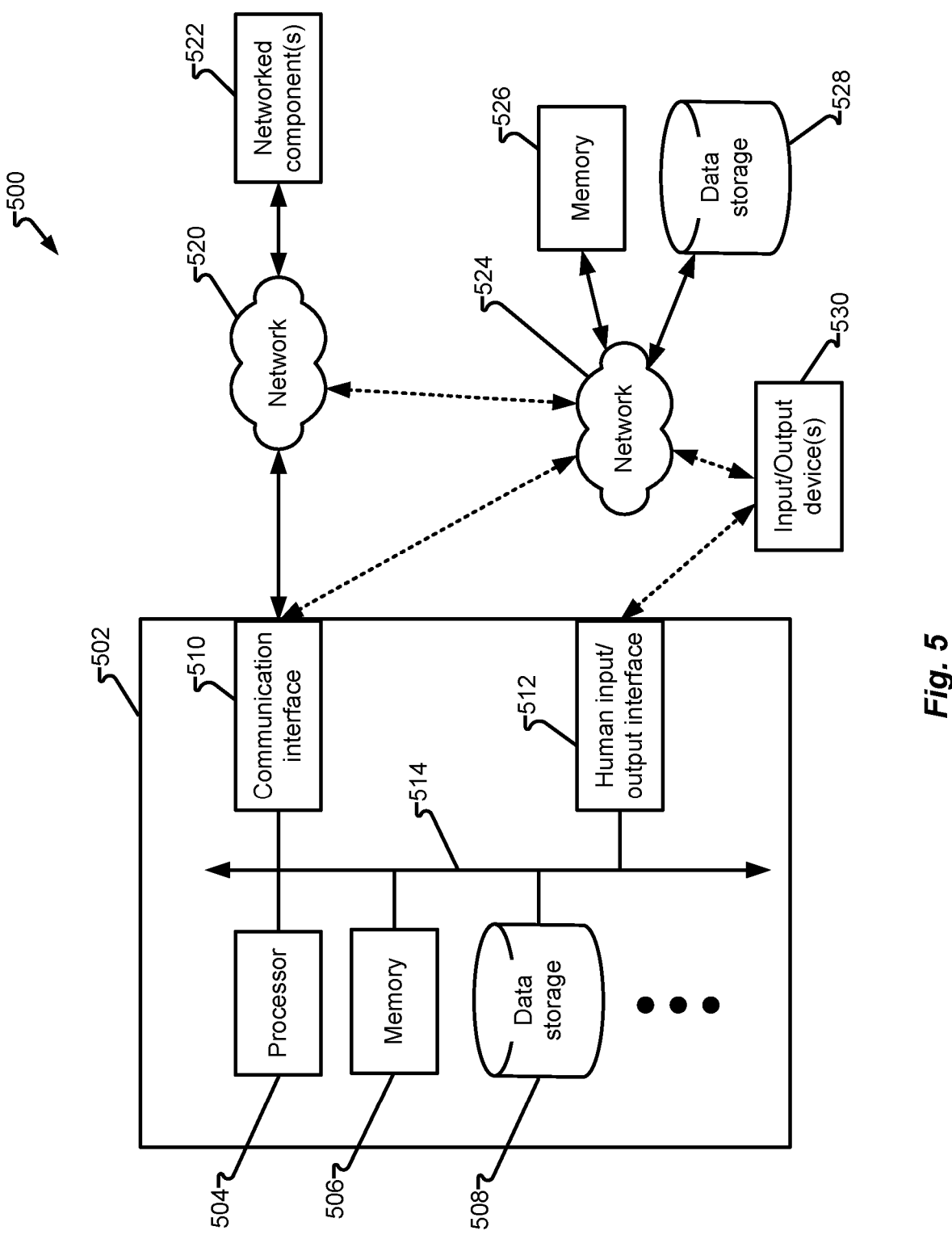
FIG. 5 depicts a system in accordance with embodiments of the present disclosure.

FIG. 5 depicts device 502 in system 500 in accordance with embodiments of the present disclosure. In one embodiment, server 104 may be embodied, in whole or in part, as device 502 comprising various components and connections to other components and/or systems. The components are variously embodied and may comprise processor 504. The term "processor," as used herein, refers exclusively to electronic hardware components comprising electrical circuitry with connections (e.g., pin-outs) to convey encoded electrical signals to and from the electrical circuitry. Processor 504 may comprise programmable logic functionality, such as determined, at least in part, from accessing machine-readable instructions maintained in a non-transitory data storage, which may be embodied as circuitry, on-chip read-only memory, computer memory 506, data storage 508, etc., that cause the processor 504 to perform the steps of the instructions. Processor 504 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 514, executes instructions, and outputs data, again such as via bus 514. In other embodiments, processor 504 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 504 is a non-transitory computing device (e.g., electronic machine comprising circuitry and connections to communicate with other components and devices). Processor 504 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 504). Processor 504 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 504, device 502 may utilize computer memory 506 and/or data storage 508 for the storage of accessible data, such as instructions, values, etc. Communication interface 510 facilitates communication with components, such as processor 504 via bus 514 with components not accessible via bus 514. Communication interface 510 may be embodied as a network port, card, cable, or other configured hardware device. Additionally or alternatively, human input/output interface 512 connects to one or more interface components to receive and/or present information (e.g., instructions, data, values, etc.) to and/or from a human and/or electronic device. Examples of input/output devices 530 that may be connected to input/output interface include, but are not limited to, keyboard, mouse, trackball, printers, displays, sensor, switch, relay, speaker, microphone, still and/or video camera, etc. In another embodiment, communication interface 510 may comprise, or be comprised by, human input/output interface 512. Communication interface 510 may be configured to communicate directly with a networked component or configured to utilize one or more networks, such as network 520 and/or network 524.

Network 108 may be embodied, in whole or in part, as network 520. Network 520 may be a wired network (e.g., Ethernet), wireless (e.g., WiFi, Bluetooth, cellular, etc.) network, or combination thereof and enable device 502 to communicate with networked component(s) 522. In other embodiments, network 520 may be embodied, in whole or in part, as a telephony network (e.g., public switched telephone network (PSTN), private branch exchange (PBX), cellular telephony network, etc.).

Additionally or alternatively, one or more other networks may be utilized. For example, network 524 may represent a second network, which may facilitate communication with components utilized by device 502. For example, network 524 may be an internal network to a business entity or other organization, whereby components are trusted (or at least more so) than networked components 522, which may be connected to network 520 comprising a public network (e.g., Internet) that may not be as trusted.

Components attached to network 524 may include computer memory 526, data storage 528, input/output device(s) 530, and/or other components that may be accessible to processor 504. For example, computer memory 526 and/or data storage 528 may supplement or supplant computer memory 506 and/or data storage 508 entirely or for a particular task or purpose. As another example, computer memory 526 and/or data storage 528 may be an external data repository (e.g., server farm, array, "cloud," etc.) and enable device 502, and/or other devices, to access data thereon. Similarly, input/output device(s) 530 may be accessed by processor 504 via human input/output interface 512 and/or via communication interface 510 either directly, via network 524, via network 520 alone (not shown), or via networks 524 and 520. Each of computer memory 506, data storage 508, computer memory 526, data storage 528 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 530 may be a router, a switch, a port, or other communication component such that a particular output of processor 504 enables (or disables) input/output device 530, which may be associated with network 520 and/or network 524, to allow (or disallow) communications between two or more nodes on network 520 and/or network 524. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core i5-3570K 22 nm Ivy Bridge, the AMD® FXTM family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method for configuring a testing application, comprising:
   executing, by a processor, an application under test (AUT) on a computing system;
   detecting, by the processor, that the computing system is co-executing an embedded browser with the AUT;
   in response to detecting the co-execution:
      performing, by the processor, a refresh operation on the AUT;
      continuously monitoring, by the processor, executing processes of the computing system during the refresh operation of the AUT;
      determining, from the monitoring, whether a refresh operation of the embedded browser has occurred concurrently with the refresh operation of the AUT;
      and when the refresh operation of the embedded browser is determined to have occurred concurrently with the refresh operation of the AUT, automatically configuring, by the processor, the testing application to:
      identify a plurality of graphical elements of the AUT;
      identify a plurality of graphical elements of the embedded browser;
      determine, from a record that binds the AUT and the embedded browser that the AUT and the embedded browser share a common graphical element;
      merge the common graphical element of the AUT and the embedded browser into a single graphical element;
      generate a set of tests directed exclusively to AUT elements, embedded browser elements and the merged common graphical elements;
      generate a test script to test the graphical element of the embedded browser; and
      omit generation of a test script of the AUT, thereby preventing redundant test script generation and improving automated software testing efficiency.

2. The method of claim 1, further comprising executing the testing application, wherein executing the testing application comprising executing the generated test script and reporting a result of the execution.

3. The method of claim 1, wherein generating the test script comprises recording an event performed on a merged common graphical element.

4. The method of claim 1, wherein generating the test script further comprises including an identifier of a merged common graphical element, the identifier comprising an identifier of the embedded browser utilized by the AUT and an identifier of the common graphical element within the embedded browser.

5. The method of claim 1, wherein the embedded browser comprises:
   a first tab associated with a first browser type; and
   a second tab within the first tab, the second tab associated with a second browser type different from the first browser type,
   wherein the common graphical element resides in the second tab.

6. The method of claim 5, further comprising testing the AUT, wherein testing the AUT comprises:
   generating another set of tests comprising a message directed to the graphical element of the second tab, sending the message to the second tab, and evaluating a result thereof;
   generating a message directed to a browser helper object (BHO) associated with the second tab;
   sending the message to the BHO; and
   evaluating the result thereof.

7. The method of claim 5, further comprising testing the AUT wherein testing the AUT comprises:
   generating another set of tests comprising a message directed to the graphical element of the second tab;
   sending the message to the second tab;
   evaluating a result thereof;
   generating a message to a browser helper object (BHO) associated with the first tab;
   sending the message to the BHO; and
   evaluating the result thereof.

8. The method of claim 1, wherein the embedded browser comprises a dynamic link library (DLL) including a web extension, the method further comprising:
   accessing the record that binds the embedded browser with the AUT; and
   accessing at least one test of another set of tests comprising a test of the embedded browser bound to the AUT, wherein the test comprises providing an input to the DLL.

9. The method of claim 1, further comprising:
   accessing the record that binds the embedded browser with the AUT; and
   accessing at least one test of another set of tests comprising a test of the embedded browser bound to the AUT, wherein the test comprises providing an input message to the embedded browser.

10. The method of claim 1, wherein determining that the system is co-executing the embedded browser with the AUT comprises:
   accessing a list of browsers;
   monitoring executing processes of the system; and
   when the executing processes include at least one other process matching a browser in the list of browsers in addition to the AUT, concluding that the system is co-executing the embedded browser with the AUT,
   wherein the executing processes of the system comprise a list of executing processes available in a task manager of the system.

11. A system for configuring a testing application, comprising:

at least one processor; and a computer memory;

wherein the at least one processor accesses a non-transitory portion of the computer memory and instructions therein to cause the at least one processor to perform:

execute an application under test (AUT) on the system;

determine that the system is co-executing an embedded browser with the AUT;

in response to the determination:

perform a refresh operation on the AUT;

continuously monitor executing processes of the system;

determine, from the monitoring, whether a refresh operation of the embedded browser occurred concurrently with the refresh operation performed on the AUT;

when the refresh operation of the embedded browser is determined to have occurred concurrently with the refresh operation performed on the AUT, automatically configuring the testing application to:

identify a plurality of graphical elements of the AUT;

identify a plurality of graphical elements of the embedded browser;

determine, from a record that binds the AUT and the embedded browser that the AUT and the embedded browser share a common graphical element;

merge the common graphical element of the AUT and the embedded browser into a single graphical element;

generate a set of tests directed exclusively to AUT elements, embedded browser elements and merged common graphical elements;

generate a test script to test the common graphical element of the embedded browser; and omit generation of a test script for the AUT thereby preventing redundant test script generation and improving automated software testing efficiency; and executing the testing application, comprising executing the generated test script and reporting a result thereof.

12. The system of claim 11, wherein generating the test script comprises recording an event performed on the common graphical element.

13. The system of claim 11, wherein generating the test script further comprises including an identifier of the common graphical element, the identifier comprising an identifier of the embedded browser utilized by the AUT and an identifier of the common graphical element within the embedded browser.

14. The system of claim 11, wherein the embedded browser comprises:

a first tab associated with a first browser type; and a second tab within the first tab, the second tab associated with a second browser type different from the first browser type, wherein the common graphical element resides within the second tab.

15. The system of claim 11, wherein the at least one processor is further configured to test the AUT, comprising:

generating another set of tests comprising a message directed to the common graphical element of second tab;

sending the message to the second tab;

evaluating the result thereof;

generating a message directed to a browser helper object (BHO) associated with the second tab;

sending the message to the BHO; and evaluating the result thereof.

16. The system of claim 14, wherein the at least one processor is further configured to test the AUT, comprising:

generating another set of tests comprising a message directed to the graphical element of the second tab;

sending the message to the second tab;

evaluating the result thereof;

generating a message directed to a browser helper object (BHO) associated with the first tab;

sending the message to the BHO; and evaluating the result thereof.

17. The system of claim 11, wherein the embedded browser comprises a dynamic link library (DLL) including a web extension.

18. The system of claim 17, wherein the at least one processor is further configured to:

accessing the record that binds the embedded browser with the AUT; and accessing at least one test of another set of tests comprising a test of the embedded browser bound to the AUT, wherein the test comprises an input to the DLL.

19. The system of claim 11, wherein the at least one processor is further configured to determine that the system is co-executing the embedded browser with the AUT comprises:

accessing a list of browsers;

monitoring executing processes of the system; and when the executing processes include at least one other process matching a browser in the list of browsers in addition to the AUT, concluding that the system is co-executing the embedded browser with the AUT, wherein the executing processes of the system comprise a list of executing processes available in a task manager of the system.

* * * * *